Nov. 28, 1933.   N. SKILLMAN   1,936,863
SELF-LUBRICATING BEARINGS AND METHOD OF FORMING THE SAME
Filed April 19, 1928
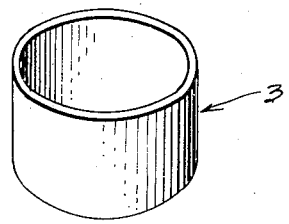
Fig.1
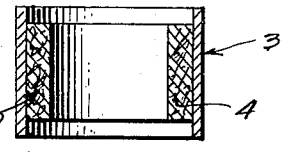
IMPREGNATED FABRIC
Fig.2
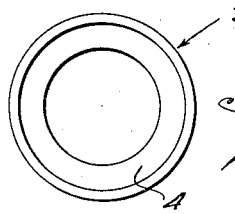
Fig.3
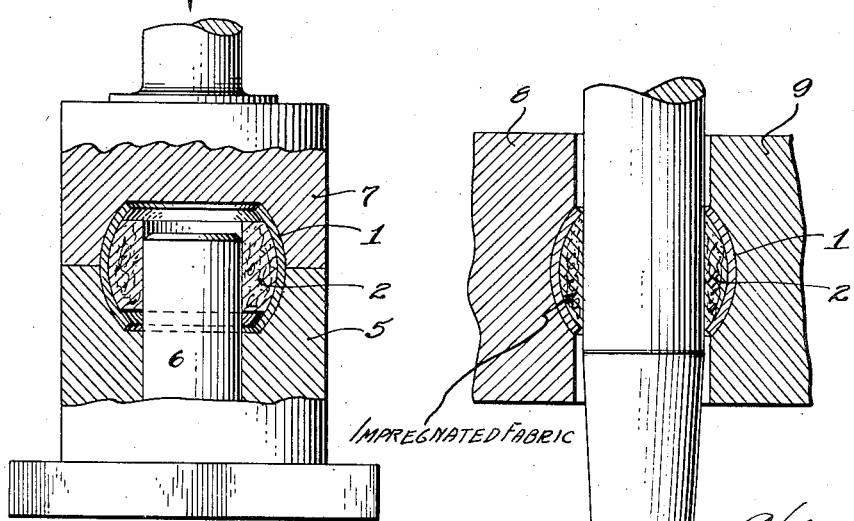
IMPREGNATED FABRIC
Fig.4
Fig.5
INVENTOR.
Newton Skillman
BY
Stuart C. Barnes
ATTORNEY.

Patented Nov. 28, 1933

1,936,863

UNITED STATES PATENT OFFICE 1,936,863

SELF-LUBRICATING BEARINGS AND METHOD OF FORMING THE SAME

Newton Skillman, Highland Park, Mich., assignor to O. & S. Bearing Co., Detroit, Mich., a corporation of Michigan Application April 19, 1928. Serial No. 271,377

8 Claims. (Cl. 29—149.5)

This invention relates to self-lubricating bearings and method of forming the same, and has to do particularly with a novel bearing of the type adapted to be used in an adjustable mounting.

In the mounting of brake cross shafts on chassis frames of automobiles, and in the mounting of various other mechanical parts for transmitting motion, it has become essential to provide adjustable bearings or bushings, and in some instances, self-aligning bearings or bushings in order to take care of inaccuracies in construction and assembly and to transmit motion with a minimum amount of friction and wear.

It is an object of the present invention to provide a bearing having a contacting bearing surface of self-lubricating material, and a supporting or adjusting surface substantially spherical in shape and formed of sheet metal. This supporting or adjusting surface comprises the exterior member of the bearing and is formed from a straight piece of metallic tubing by a novel method.

More specifically, this novel method of forming a bearing contemplates the fabrication of a definite length of straight metallic tubing, the placing therein of a predetermined amount of self-lubricating material, and the applying of pressure to said cylindrical tubing, in one operation, to form a bearing having a substantially spherical surface. The self-lubricating material by this step is confined within the spherical member of the bearing and is then expanded and compressed into shape whereby to form a lubricating bushing surface which is resilient and expansible but very compact.

In the drawing:

Fig. 1 is a perspective view of a cylindrical piece of metallic tubing cut to a predetermined length, from which the bearing is formed.

Fig. 2 is a vertical sectional view illustrating the second step in the assembly wherein a flat strip of lubricant impregnated fibrous material is inserted within the cylindrical tube.

Fig. 3 is a plan view of the assembly shown in Fig. 1.

Fig. 4 is a front view partially in section illustrating the step of forming the cylindrical tubing into a substantially spherical bearing in one stamping operation.

Fig. 5 is a longitudinal sectional view, diagrammatically illustrating the step of compressing and distributing the lubricant impregnated fibrous material within the spherical shell to form the finished article.

My complete bearing, as a finished article, is shown in Fig. 5 as comprising an outer section or bearing member 1, substantially spherical in shape and having walls of uniform thickness, and an inner annular bushing 2 formed of lubricant impregnated fibrous material compressed to the proper size and completely filling the outer portion of the spherical bearing 1. This presents a very light and inexpensive bearing member for universal or adjustable joints and the like, and due to the thinness and uniform thickness of the outer bearing member or shell I have made it possible to use a relatively large amount of compressed impregnated fibrous material corresponding to the diameter of the spherical bearing member. In other words, due to this novel formation of the outer shell of the bearing, an unusual amount of resiliency and expansiveness is obtained which directly tends to lengthen the life of the bearing. It will be obvious that if the bearing were machined from a solid piece of metal that to obtain the same proportion of spherical bearing surface, the bearing would have to be larger in order to provide for the required thickness of self-lubricating bushing.

The specific type of bearing illustrated is particularly designed as an adjustable or self-aligning member for a number of shaft mountings, a specific application being for oscillatory cross brake shafts in automobile chassis. The bearing is particularly adapted for such use as it not only permits initial adjustment or continuous self-alignment, but presents a bearing having an unusually long life and one that is inherently noiseless.

The method of making my improved bearing is also novel and the preferred steps of such method are illustrated in the drawing. Instead of taking a piece of stock of considerable thickness and turning the same down to shape to form an outer spherical surface and an inner cylindrical surface, I preferably take a predetermined length of cylindrical metallic tubing having a relatively thin wall, as shown at 3 in Fig. 1. A flat strip of woven fibrous material suitably impregnated with lubricant is cut to the desired length and inserted in the cylindrical metallic tubing 3, as shown in Fig. 2. This woven impregnated fabric may be designated 4, in the form shown in Fig. 2, and is preferably relatively thick and of a length slightly less than the tubing 3.

This cylindrical tube 3, together with the annularly positioned strip of fabric 4 is then placed in a suitable die member and formed into a spherical shape in one operation. This forming of the cylindrical metallic tubing into a substantially spherical bearing member may be accomplished by various means, but in Fig. 4 I have shown one preferred manner of carrying out this step. The showing is merely diagrammatic but a suitable lower die member 5 is provided with a suitable pilot 6 and the assembled article, as shown in Fig. 2, may be placed in the lower die member. The impregnated fabric is preferably held in place by the pilot 6, but not necessarily so. An upper die member 7 may then be brought into stamping or working position in a normal manner to stamp the cylindrical bearing and shape the same into a substantially spherical bearing member, as shown in Fig. 4.

The spherical member 1 is then next placed in a suitable chuck-head and a tapered spindle of a predetermined diameter is longitudinally inserted through the rotating bearing member to radially expand and compress the impregnated fibrous material into compact form whereby to fill out the entire space between the spindle and spherical shell 1 and also to compress the bushing to the required diameter.

It will thus be seen that I have provided a novel self-lubricating bearing which is not only efficacious as a bearing member of the adjustable or self-aligning type, but which is also formed of materials which are relatively inexpensive and which particularly are very quick and easy to assemble and fabricate with a minimum of expense. My novel bearing is not only more efficient as a self-lubricating bearing than bearings of the solid turned-out and machined type, but is also so fabricated and formed of materials as to greatly reduce the comparative cost of manufacture.

What I claim is:

1. The method of forming self-lubricating bearings, which comprises inserting a strip of lubricant impregnated fibrous material within a substantially cylindrical metallic member of predetermined length, and then applying pressure to said cylindrical unit to form said member into a bearing member substantially spherical in shape and simultaneously compress and shape said fibrous material to completely fill the interior surface of said bearing member and form the sole interior supporting surface of the bearing.

2. The method of forming self-lubricating bearings which comprises freely positioning a strip of lubricant impregnated fibrous material within a substantially cylindrical metallic member, distorting the walls of said cylindrical member by pressure applied axially thereof to form a substantially spherical outer bearing member and to partially shape and form said fibrous material, and then radially expanding said fabric to fill up all the space adjacent the interior concave surface of said spherical bearing member and provide a bushing of the required diameter.

3. The method of forming self-lubricating spherical bearings, which comprises inserting a strip of lubricant impregnated fibrous material within a predetermined length of substantially cylindrical tubing and distorting the tube and outer surface of the material to a substantially spherical shape in a single operation, the material completely filling the inner surface of the distorted tubing and forming the sole inner bearing surface of the bearing.

4. A bearing consisting solely of a substantially spherical outer member formed of a length of metallic tubing of uniform wall thickness and an expansible bushing of compressed lubricant impregnated fibrous material held within said outer bearing and forming a direct and the only bearing surface for the article to be supported.

5. A self-lubricating bearing, comprising a substantially spherical outer member having walls of substantially uniform thickness, and an annular ring of expansible compressed lubricant impregnated fibrous material having an inner wall shaped to receive and solely support a journal and the like and an outer wall substantially spherical in shape complementally with the inner surface of said member.

6. A self-lubricating bearing comprising an outer member formed of a single piece of tubing of uniform wall thickness and a bushing formed only of lubricant impregnated fibrous material for directly and solely supporting a journal member and the like, said bushing being expansible and gradually increasing in thickness towards the center of said bearing.

7. The method of forming self-lubricating bearings, which comprises freely positioning a single cylindrical strip of lubricant impregnated fibrous material within a single substantially cylindrical metallic member of predetermined length, and then applying pressure directly to said cylindrical metallic member to shape said fibrous material and form a bearing member substantially spherical in shape, said material completely filling said spherical member and forming the sole inner bearing surface of the bearing.

8. A self-lubricating bearing comprising an outer one piece sheet metal shell and an expansible bushing of lubricant impregnated fibrous material of spherical contour and supported directly and solely by said spherical shell, said bushing being provided with a cylindrical opening for directly receiving and solely supporting a journal and the like.

NEWTON SKILLMAN.